June 24, 1969  R. JUNG  3,451,565
DISCHARGING DEVICE FOR SILOS
Filed July 26, 1966  Sheet 1 of 2

INVENTOR
Richard Jung

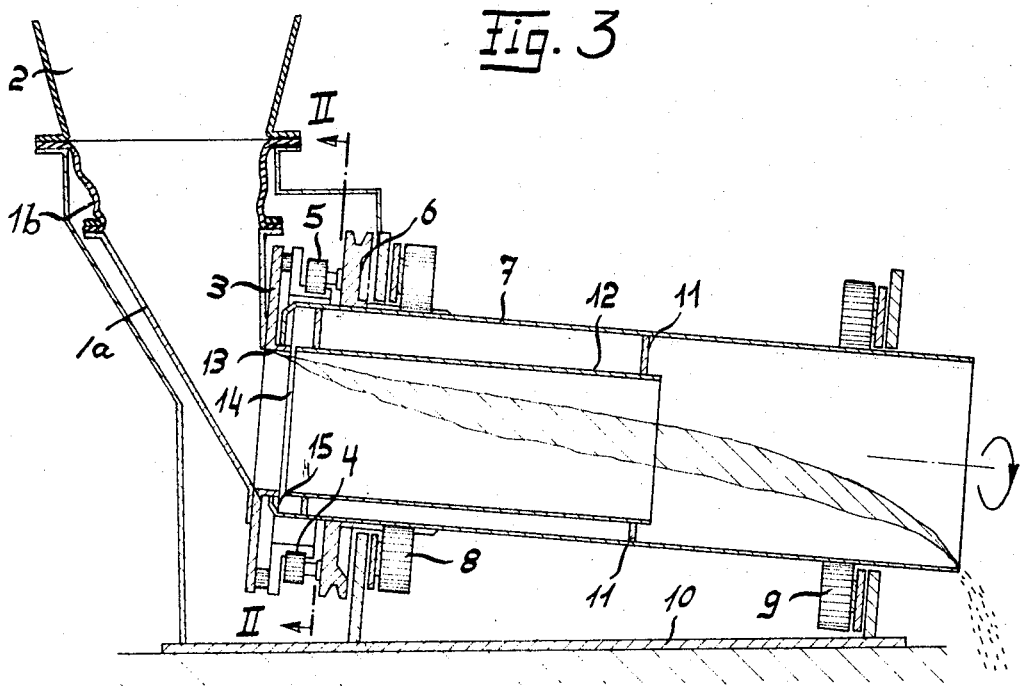

United States Patent Office 3,451,565  
Patented June 24, 1969

3,451,565  
DISCHARGING DEVICE FOR SILOS  
Richard Jung, Gummersbach, Germany, assignor to L. & C. Steinmuller G.m.b.H., Gummersbach, Germany  
Filed July 26, 1966, Ser. No. 567,880  
Claims priority, application Germany, Aug. 3, 1965, St 24,219  
Int. Cl. B65g *65/34, 65/70;* B65d *37/00*  
U.S. Cl. 214—17                    7 Claims

ABSTRACT OF THE DISCLOSURE

A device for withdrawing pulverous cohesive pourable material from a silo, which includes hopper means having an inlet section for flow communication with a silo and also having an outlet section which is in flow communication with rotatable tubular conveying means, said outlet section being subjected to an oscillatory movement in response to a rotation of said tubular conveying means.

---

The present invention relates to a device for withdrawing pulverous cohesive pourable goods from a silo which goods do not flow out of the silo by themselves and which have the tendency, when employing force during the withdrawing operation, to stick to or form a crust on the withdrawing means. Many of this type of goods require a careful handling in order to overcome the flow resistance in the feed, and this handling should, if possible, just overcome the force of gravity. The customary mechanical devices, such as conveyor worms, rotatable traps, turntable feeders, or the like, are insufficient in this connection and meet the requirements in an unsatisfactory manner. Pneumatic methods frequently cause dust problems and also cause the loss of the frequently highly valuable finest particles when the necessary separation of the material from the transporting air flow is effected.

It is, therefore, an object of the present invention to provide a discharging device for silos for discharging pulverous cohesive pourable goods, which will overcome the above mentioned drawbacks.

It is another object of this invention to provide a device as set forth above, which will assure a substantially uniform flow of the goods from the silo to be discharged.

These and other objects and advantages of the invention will appear more clearly from the following specification in connection with the accompanying drawing, in which:

FIG. 3 is a slight modification over FIG. 1.

Figure 1:
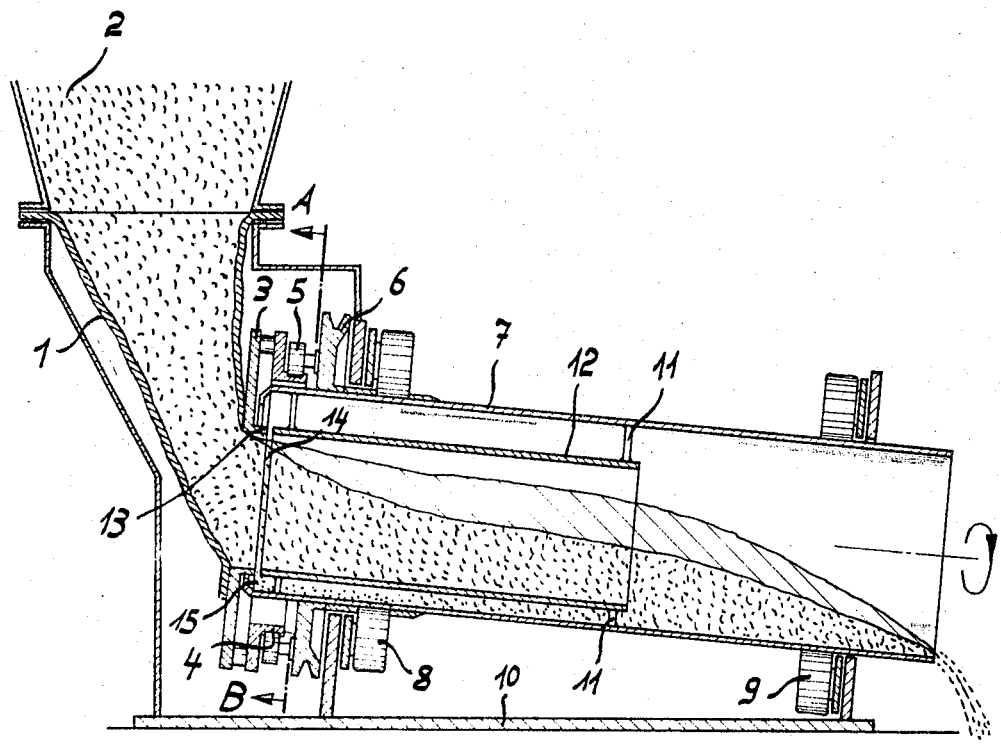
FIG. 1 is a longitudinal section through an embodiment of the present invention.
Figure 2:
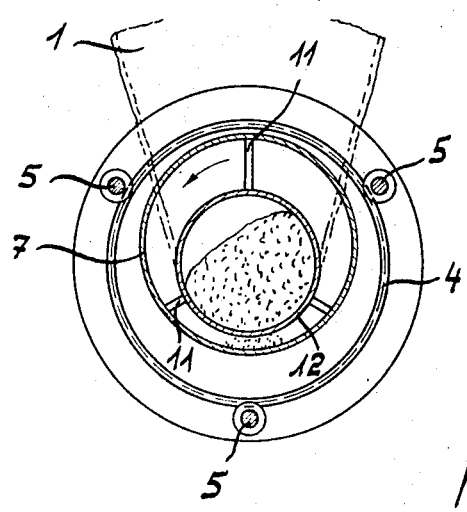
FIG. 2 is a cross section along the line II—II of FIG. 1.

The present invention is characterized primarily in that at the end of the silo from which goods are to be discharged, there is provided a flexible hopper or funnel which leads for instance into a rotatable pipe for metering and conveying the goods, the end of said hopper carrying out an oscillating movement. The wall of said hopper may be of synthetic material, as for instance polyvinyl-chloride (PVC) or rubber and has its upper edge connected to the rigid silo. The outlet end of said hopper is coupled to the rotatable pipe by means of a guiding ring through the intervention of an eccentric roller arrangement. The eccentric movement of this ring in a plane perpendicular to the axis of the rotary pipe, and the corresponding changes in the shape of the hopper wall connected thereto will prevent the bridging of the material in the conical merging portion from the silo to the rotatable pipe as it occurs when a rigid connection is effected between the outlet of the silo and the adjacent portion of the discharging device. The effective range of the oscilating movement extends beyond the upper hopper connection which has a sufficiently wide cross section so that a continuous flow of the goods from the silo will be assured. The guiding ring of the flexible hopper has at its inner marginal portion a protruding collar extending into the rotatable pipe. In order, at this section to prevent the material from flowing toward the outside, the rotatable pipe which is downwardly inclined in the feeding direction has its entrance designed with a double wall and has the inner pipe so arranged that between its end face and the protruding collar of the guiding ring there will remain a small axial gap only. The very minor portion of the material which enters the annular space between the inner and outer pipe through the said gap will in view of the rotation of the downwardly inclined pipe be conveyed to the outlet end and will at the end of the inner pipe again be drawn into the main flow. This shunt or side flow will not pass to the end face of the outer pipe which with regard to the inner gap is axially offset with regard to the inflow side. In the rotatable pipe, unavoidable irregularities in the flow from the silo will be compensated for in the continuously rotated goods before the goods reach the outlet end. The feed or goods being conveyed will within the entire conveying system be subjected only to a minimum force so that the device will also work highly satisfactorily when rather sensitive goods are involved. When adhesive goods are involved which have the tendency to stick to the pipe walls, it is advantageous to replace the inner pipe by a self-cleaning bar grid structure.

Referring now to the drawing in detail, the discharging device shown therein comprises a flexible hopper or funnel 1 the upper marginal portion of which is adapted to be connected to a silo 2 for storing pourable goods. The outlet portion of said hopper 1 is connected to a guiding ring 3 and by means of said ring 3 is through the intervention of an annular groove 4 and rollers 5 on a driving pulley 6 coupled to a rotatable pipe 7. The rollers 5 are arranged along a circle which is eccentric with regard to the axis of rotation of the rotatable pipe so that the guiding ring 3 will carry out an oscillating movement in the plane which is perpendicular to the axis of rotation of said rotatable pipe 7. This oscillating movement assures the flow of the material through the hopper 1 which is likewise subjected to movements.

As will be seen from the drawing, the rotatable pipe 7 is journalled in roller guiding means 8 and 9 supported by a stand 10 and has a double wall at its entrance portion. In this connection it is advantageous to provide an inner pipe 12 which is coaxial with the guiding ring 3 and is rigidly connected to the outer pipe 7 by bolts 11. The inner pipe 12 which is thus eccentrically located in the rotatable pipe or rotor 7 will in any position of said rotor be flush with the protruding collar 13 of the guiding ring 3. The material which penetrates through the axial gap 14 between the end faces of the inner pipe 12 and the collar 13 and enters the annular space between the inner pipe 12 and the outer pipe 7 is due to the rotation of the downwardly inclined rotor 7 conveyed in the feeding direction and after leaving the said annular space at the end of the inner pipe will be drawn back into the main flow. When goods are involved which have a limited flow ability, the shunt or side flow is extremely small. The material, which leaves the inner gap 14 and when hitting the inner wall of the outer pipe will without accumulating be conveyed to the outlet end, does not move up to the end wall of the outer pipe which is axially offset with regard to the inner gap. Thus, a flowing out of the material through the outer gap 15 between the end face of the outer wall and the guiding ring 3 will be prevented.

Thus, without changing the design of the device, the inlet hopper or funnel 1 may be provided with a rigid wall and may through the intervention of a flexible intermediate member or coupling be connected to the silo.

Such an arrangement is shown in FIG. 3 in which the rigid wall hopper is designated with the reference numeral 1a and is connected to the silo 2 by a flexible intermediate member 1b.

What I claim is:

1. A device for withdrawing pulverous cohesive pourable material from a silo, which includes: hopper means of flexible material having an inlet section rigidly connected to said silo and adapted to be placed in flow communication with a silo from which the pourable material is to be withdrawn, said hopper means also having a flexible outlet section extending therefrom along a substantially vertical axis to an opening normal thereto, rotatable conveying means arranged in an axis coinciding with the direction of free movement of material therein substantially normal to the vertical axis and in flow communication with the opening of said outlet section, and means operatively connected to said rotatable connecting means and to said outlet section and operable in response to a rotation of said conveying means to subject said outlet section to an oscillatory movement at the location of the flow communication with the opening of said outlet section.

2. A device for withdrawing pulverous cohesive pourable material from a silo, which includes: hopper means having an inlet section adapted to be placed in flow communication with a silo from which the pourable material is to be withdrawn, said hopper means also having an outlet section, conveying means in the form of a rotatable tubular member arranged in flow communication with said outlet section, driving means operatively connected to said rotatable tubular member for rotating the same, guiding ring means connected to said outlet section and provided with a roller path eccentrically arranged with regard to the axis of rotation of said tubular member, and roller means rotatably connected to said driving means for rotation thereby, said roller means engaging said roller path so as to impart an oscillatory movement on said ring means in response to the operation of said driving means.

3. A device according to claim 2, in which said driving means includes a pulley connected to said tubular member and carrying said roller means, said roller path being eccentrically arranged with regard to said pulley.

4. A device according to claim 2, in which said guiding ring means is provided with a collar extending into said rotatable tubular member in radially spaced relationship to the latter so as to form an annular gap therebetween.

5. A device according to claim 4, which includes an additional pipe arranged inside said first mentioned pipe and having one end arranged adjacent said collar and being shorter than said first mentioned pipe, said additional pipe forming an extension of the passage defined by said collar and being connected to said first mentioned pipe in radially spaced relationship thereto for rotation with said first mentioned pipe.

6. A device according to claim 5, in which the inner diameter of said additional pipe corresponds substantially to the inner diameter of the passage defined by said collar.

7. A device according to claim 5, in which that end of said additional pipe which is adjacent said collar is axially spaced from the latter by a narrow gap only.

References Cited

UNITED STATES PATENTS

| | | | |
|---|---|---|---|
| 1,696,587 | 12/1928 | Yarwood | 222—201 |
| 3,090,507 | 5/1963 | Gutekunst et al. | 214—17 |
| 1,487,058 | 3/1924 | Gwinn | 222—203 |
| 3,071,295 | 1/1963 | Heller | 222—410 X |
| 3,273,759 | 9/1966 | Rigterink et al. | 222—202 |

ROBERT G. SHERIDAN, *Primary Examiner.*

U.S. Cl. X.R.

222—201, 203, 210